United States Patent
Zhao et al.

(10) Patent No.: US 12,130,022 B2
(45) Date of Patent: Oct. 29, 2024

(54) HEAT SUPPLY SYSTEM COUPLING PASSIVE PHASE CHANGE ENERGY STORAGE SUNLIGHT ROOM AND AIR SOURCE HEAT PUMP

(71) Applicant: TIANJIN UNIVERSITY, Tianjin (CN)

(72) Inventors: Jing Zhao, Tianjin (CN); Dehan Liu, Tianjin (CN); Shilei Lyu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/039,672

(22) PCT Filed: Sep. 28, 2022

(86) PCT No.: PCT/CN2022/121981
§ 371 (c)(1),
(2) Date: May 31, 2023

(87) PCT Pub. No.: WO2023/056861
PCT Pub. Date: Apr. 13, 2023

(65) Prior Publication Data
US 2024/0263806 A1   Aug. 8, 2024

(30) Foreign Application Priority Data
Oct. 8, 2021   (CN) .......................... 202111168140.6

(51) Int. Cl.
*F24D 15/04* (2006.01)
*F24D 17/00* (2022.01)
(Continued)

(52) U.S. Cl.
CPC ......... *F24D 15/04* (2013.01); *F24D 17/0015* (2013.01); *F24S 20/61* (2018.05); *F24S 60/10* (2018.05)

(58) Field of Classification Search
CPC .. F24D 15/04; F24D 17/0015; F24D 11/0221; F24D 11/0264; F24D 2200/14;
(Continued)

(56) References Cited

U.S. PATENT DOCUMENTS

2008/0176504 A1* 7/2008 McClendon ............ F24S 10/50
454/251
2020/0386447 A1* 12/2020 Wang ...................... F24F 5/005

FOREIGN PATENT DOCUMENTS

| CN | 101943481 A | 1/2011 |
| CN | 104145747 A | 11/2014 |

(Continued)

OTHER PUBLICATIONS

International Search Report of PCT/CN2022/121981.
Written Opinion of PCT/CN2022/121981.

*Primary Examiner* — Joseph F Trpisovsky

(57) ABSTRACT

The present disclosure discloses a heating system coupling a passive phase change energy storage sunlight room with an air source heat pump. The heating system includes a passive phase change energy storage sunlight room (7), phase change heat storage units, a to-be-heated room (8), and an air source heat pump air heater arranged between the passive phase change energy storage sunlight room (7) and the to-be-heated room (8), wherein each phase change heat storage unit (11) consists of a plurality of phase change heat storage modules (1). An opening in the front part of each phase change heat storage module faces an interior of the passive phase change energy storage sunlight room, and the phase change heat storage modules located on the top are spliced transversely, and the vent in the top of each phase change heat storage module is connected with the ventilation port of the room.

2 Claims, 3 Drawing Sheets

(51) Int. Cl.
*F24S 20/61* (2018.01)
*F24S 60/10* (2018.01)

(58) Field of Classification Search
CPC .......... F24S 20/61; F24S 60/10; F24F 5/0046; F24F 2005/0064
See application file for complete search history.

(56) References Cited

FOREIGN PATENT DOCUMENTS

| | | |
|---|---|---|
| CN | 110578960 A | 12/2019 |
| CN | 110595244 A | 12/2019 |
| CN | 212029682 U | 11/2020 |
| CN | 112856551 A | 5/2021 |
| CN | 113587190 A | 11/2021 |
| JP | 06174272 A | 6/1994 |

\* cited by examiner

HEAT SUPPLY SYSTEM COUPLING PASSIVE PHASE CHANGE ENERGY STORAGE SUNLIGHT ROOM AND AIR SOURCE HEAT PUMP

CROSS-REFERENCE TO RELATED APPLICATIONS

This Application is a national stage application of PCT/CN2022/121981. This application claims priorities from PCT Application No. PCT/CN2022/121981, filed Sep. 28, 2022, and from the Chinese patent application 202111168140.6 filed Oct. 8, 2021, the content of which are incorporated herein in the entirety by reference.

TECHNICAL FIELD

The present disclosure relates to the technical field of heat pumps and residential heating by heat pumps, in particular to an air source heat pump and a heat supply system coupling the heat pump with a passive solar energy storage sunlight room.

BACKGROUND ART

The air source heat pump is a clean heating technology for transferring heat in outdoor low-temperature ambient air into an indoor space by a steam compression circulation system driven by a motor, which is widely promoted and applied in clean heating transformation in rural areas in north China. However, as the outdoor temperature in north China is lower in winter, the evaporation temperature of the air source heat pump system is frequently in a relatively unfavorable ambient temperature, which easily leads to an excessive compression ratio of a compressor, excessively low heating capacity, and the coefficient of performance (COP) of the unit to be reduced greatly in the operating process. This results in a huge increase in power consumption.

In order to solve the problem of low temperature adaptability of the air source heat pump, researches focus on solar-assisted air source heat pump systems. Most traditional combination methods of solar energy and the air source heat pump apply the solar water heating to increase the ambient temperature of the evaporative side of the system. Although the problem of poor operation effect of a traditional air source heat pump in low-temperature environment can be solved, as a solar water heating system cannot be directly connected with a room heating system, the room still needs to be heated by the air source heat pump in the daytime, resulting in a decrease in the utilization rate of the solar energy.

A passive sunlight room applies a solar energy utilization technology economically and efficiently, which is conducive to improving the utilization rate of the solar energy and reducing a building heat load. However, as the traditional passive sunlight room is greatly affected by the solar radiation intensity, and has the characteristics of fluctuation and intermittency, it cannot meet the heating demand of the room around the clock due to large temperature difference between day and night.

The air source heat pump is combined with the passive sunlight room so that the room is heated by the passive sunlight room during the day and heated by the air source heat pump at night. Meanwhile, the COP of the air source heat pump can be improved by the heat stored by the sunlight room during the day, and the time matching problem of the room heating can be solved. However, as the traditional sunlight room is low in heat storage capacity, and cannot release heat for a long time at night, at present, it is urgent to solve the technical problem of how to improve the heat storage rate of the solar energy and maintain an efficient heating interval achieved by combining the sunlight room and the solar energy.

SUMMARY

In order to overcome the shortcomings in the prior art, the present disclosure provides a heat supply system coupling a passive phase change energy storage sunlight room and an air source heat pump. The heat system achieves the purpose of increasing the heat storage capacity of a sunlight room through phase change energy storage by an air source heat pump system to improve the utilization efficiency of solar energy and the heating efficiency of the air source heat pump.

In order to solve the above problems, the present disclosure provides the following technical solution:

a heat supply system coupling a passive phase change energy storage sunlight room and an air source heat pump includes a passive phase change energy storage sunlight room, phase change heat storage units, a to-be-heated room, and an air source heat pump air heater arranged between the passive phase change energy storage sunlight room and the to-be-heated room, wherein each phase change heat storage unit consists of a plurality of phase change heat storage modules.

The air source heat pump air heater further includes an air source heat pump evaporator, an air source heat pump compressor, an air source heat pump condenser and an air source heat pump expansion valve; wherein:

the phase change heat storage units and the air source heat pump evaporator are arranged in the passive phase change energy storage sunlight room; a ventilation port and the air source heat pump condenser are arranged in the to-be-heated room; and the air source heat pump expansion valve and the air source heat pump compressor are arranged on a circuit consisting of the air source heat pump evaporator and the air source heat pump condenser.

Prismatic ventilation ducts with a uniform size are arranged at a bottom, a front part and an upper part of each phase change heat storage module respectively, and a vent with the same size as that of the prismatic ventilation ducts is additionally welded on a top of each phase change heat storage module; and a ventilation duct is arranged in each phase change heat storage module.

Each phase change heat storage module is made of stainless steel by welding, with a heat absorption coating on its outer surface, and phase change materials being filled therein; and the phase change materials are prepared from paraffin wax and expanded graphite through compounding, and a phase change temperature thereof is between 20° C. and 25° C.

The vents of the phase change heat storage modules located on the top are spliced with the vents of other phase change heat storage modules to achieve a combination of the plurality of phase change heat storage modules.

An opening in the front part of each phase change heat storage module faces an interior of the passive phase change energy storage sunlight room to achieve heat exchange with air in the passive phase change energy storage sunlight room through natural convection; and the phase change heat storage modules located on the top are spliced transversely, and the vent in the top of each phase change heat storage module is connected with the ventilation port of the room, which facilitates heat exchange between high-temperature hot air in the passive phase change energy storage sunlight room and air in the room through convection in the daytime.

Compared with the prior art, the present disclosure has the following advantages:
(1) the component-based phase change heat storage modules are simple in assembly and flexible in arrangement, and can be freely arranged and combined according to actual conditions; the dark coatings on the outer surfaces of the phase change heat storage modules are capable of improving the collection rate of the solar energy; the connection among the vents of the modules facilitates delivery of warm air in the passive phase change energy storage sunlight room to the room, and as a result the heat exchange efficiency between the phase change heat storage modules and the air in the passive phase change energy storage sunlight room is improved;
(2) the operating time of the air source heat pump is reduced, the COP of the unit is increased, and the operating cost is decreased greatly;
(3) the solar energy is collected by the passive phase change energy storage sunlight room during the day, and the heat is stored in the phase change heat storage modules and walls of the passive phase change energy storage sunlight room; meanwhile, high-temperature air in the passive phase change energy storage sunlight room can meet the heating requirements of the room in the daytime by opening the vents of the phase change heat storage modules and operable windows; due to the storage of part of heat collected by the passive phase change energy storage sunlight room, the peak of the internal air temperature of the passive phase change energy storage sunlight room is reduced, and therefore the fluctuation of room temperature is reduced; the duration of ventilation and heat exchange between the passive phase change energy storage sunlight room and the indoor room is prolonged, and the utilization efficiency of the solar energy is improved;
(4) when the internal air temperature of the passive phase change energy storage sunlight room is lower than the indoor temperature at night, the operable windows and vent valves are closed, and the air source heat pump provides heating for the room. The ambient temperature of the air source heat pump evaporator is increased by the heat stored in the passive phase change energy storage sunlight room and the phase change heat storage modules, so that the ambient temperature of the air source heat pump evaporator is kept in a high COP working range; the energy consumption of the air source heat pump for heating is reduced, and the problems of intermittence and instability of the solar energy are solved; and the purpose of fully and comprehensively using the solar energy is achieved.

BRIEF DESCRIPTION OF REFERENCE SIGNS 1. phase change heat storage module, 2. air source heat pump evaporator, 3. air source heat pump compressor, 4. air source heat pump condenser, 5. air source heat pump expansion valve, 6. ventilation port, 7. passive phase change energy storage sunlight room, 8. to-be-heated room, 9. prismatic ventilation duct, 10. vent, 11. phase change heat storage unit, and 12. ventilation duct.

DETAILED DESCRIPTION OF THE PRESENT DISCLOSURE

The technical solution of the present disclosure will be described below in detail with reference to accompanying drawings and specific embodiments.

Figure 1:
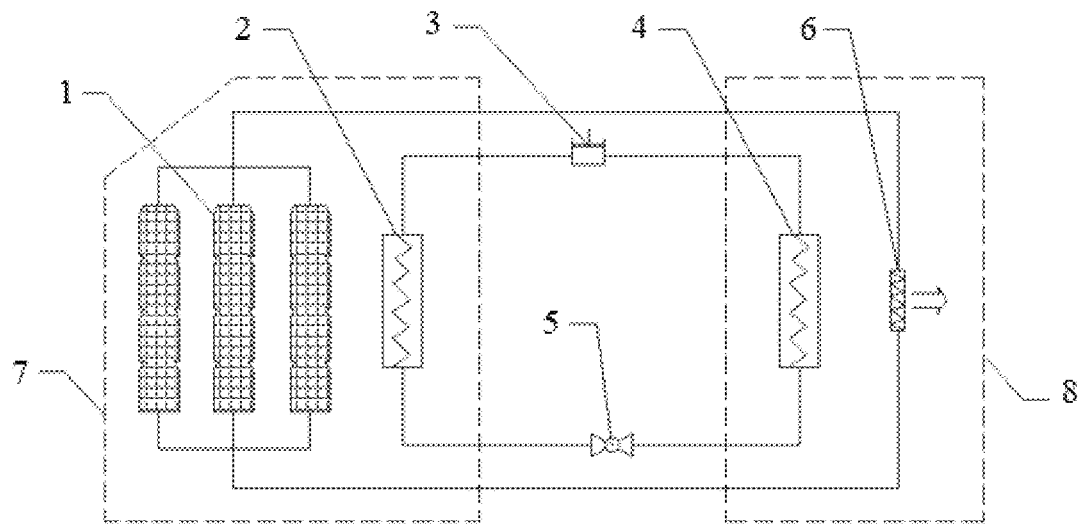
FIG. 1 is a structural schematic diagram of a heat supply system coupling a passive phase change energy storage sunlight room and an air source heat pump according to the present disclosure.

FIG. 1 is a structural schematic diagram of a heat supply system coupling a passive phase change energy storage sunlight room and an air source heat pump according to the present disclosure. The heat supply system coupling the passive phase change energy storage sunlight room and the air source heat pump in the present disclosure mainly consists of a passive phase change energy storage sunlight room, phase change heat storage modules 1 and an air source heat pump air heater. Wherein, the phase change heat storage modules 1 and the air source heat pump evaporator 2 are arranged in the passive phase change energy storage sunlight room 7, and the air source heat pump condenser 4 and a ventilation port 6 are arranged in the to-be-heated room 8. The air source heat pump expansion valve 5 and the air source heat pump compressor 3 are arranged on a circuit consisting of the air source heat pump evaporator 2 and the air source heat pump condenser 4. The air source heat pump condenser 4 is arranged at an internal bottom of the to-be-heated room, and a forced draft fan is used for heating the to-be-heated room 8.

Figure 2:
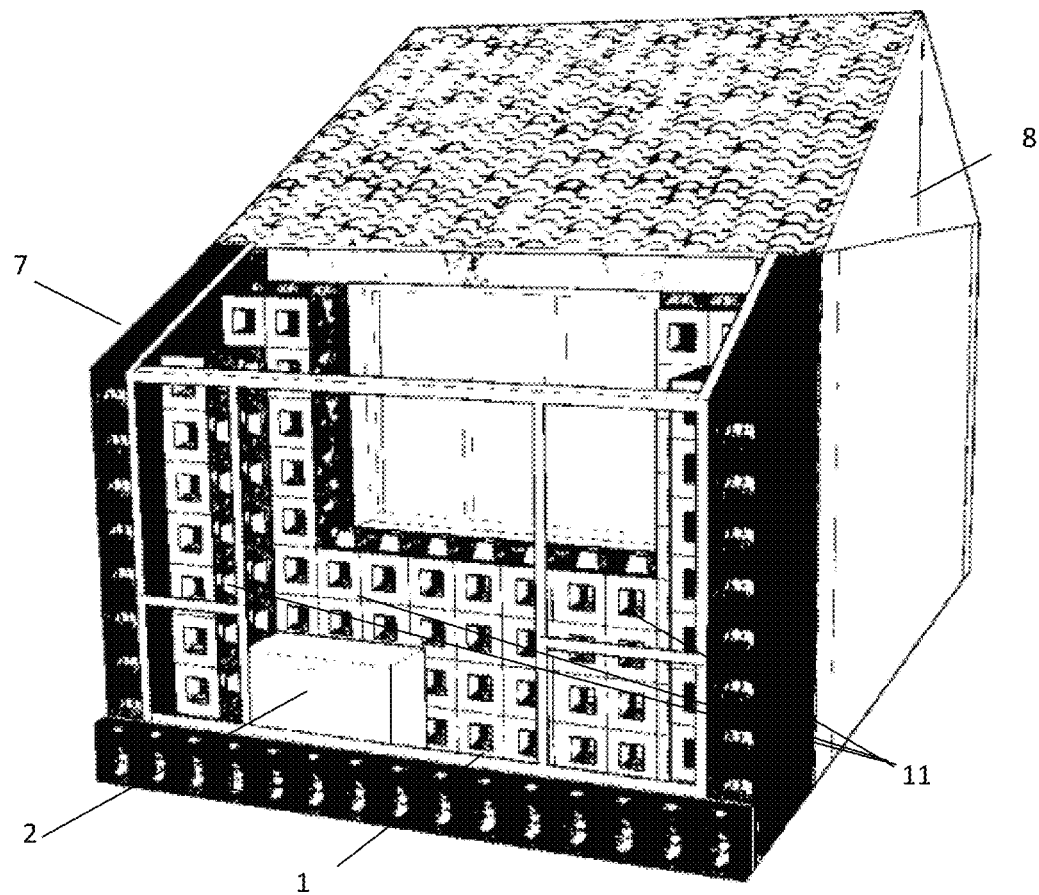
FIG. 2 is an installation diagram of a passive phase change energy storage sunlight room, a to-be-heated room, phase change heat storage modules and an air source heat pump evaporator.

FIG. 2 is an installation diagram of a passive phase change energy storage sunlight room, a to-be-heated room, phase change heat storage modules and an air source heat pump evaporator. FIG. 2 shows the concrete structure and position relationship of the passive phase change energy storage sunlight room, the to-be-heated heating room, the phase change heat storage units and the air source heat pump evaporator which are combined together. Each phase change heat storage unit 11 of the passive phase change energy storage sunlight room is formed by adding the phase change heat storage modules in the passive phase change energy storage sunlight room on a south side of a building, wherein each phase change heat storage unit 11 consists of a plurality of phase change heat storage modules 1. The phase change heat storage units 11 are arranged based on a solid wall of the passive phase change energy storage sunlight room, wherein the phase change heat storage unit 11 close to a top of a north side of the passive phase change energy storage sunlight room is communicated with indoor air through the ventilation port formed in a south wall of the room. The air source heat pump evaporator 2 is surrounded by the phase change heat storage modules of the passive phase change energy storage sunlight room 7.

The passive phase change energy storage sunlight room is additionally built on the south side of the to-be-heated room, and connected with the south wall of the to-be-heated room. The south wall of the to-be-heated room is a solid wall with a dark thermal insulation coating on its outer surface, wherein a highly transparent thermal insulation window made of broken bridge aluminum and provided with an operable window is arranged on the south wall.

Bottoms of east, west and south facades of the passive phase change energy storage sunlight room consist of heat preservation bricks and dark coatings on inner and outer surfaces of the walls. A roof and an upper part of the south facade of the passive phase change energy storage sunlight room mainly comprises highly transparent thermal insulation glass which is connected with the east and west vertical walls and the south wall of the room by broken bridge aluminum materials in a sealing manner. The heat preservation bricks are built at the bottom of the passive phase change energy storage sunlight room to increase a distance between the passive phase change energy storage sunlight room and the ground, and therefore the thermal insulation property is improved.

Figure 3:
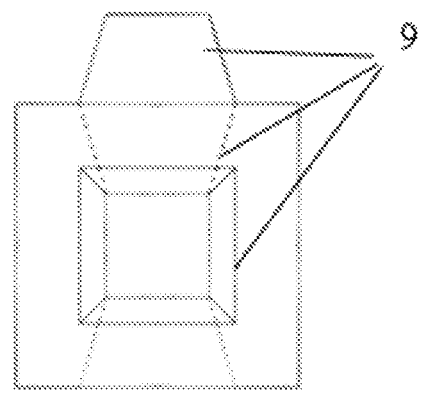
FIG. 3 is a front view of a phase change heat storage module.
Figure 4:
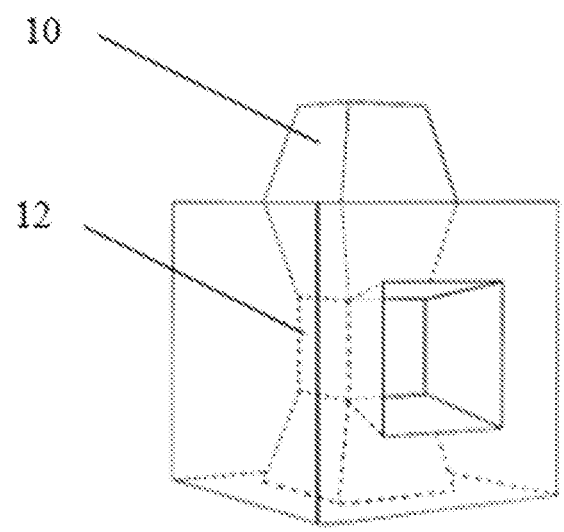
FIG. 4 is a section view of a phase change heat storage module.

FIG. 3 is a front view of a phase change heat storage module. FIG. 4 is a section view of a phase change heat storage module. Prismatic ventilation ducts 9 with a uniform size are formed at a bottom, a front part and an upper part of each phase change heat storage module respectively, and a vent 10 with the same size as that of the prismatic ventilation ducts is additionally welded on a top of each phase change heat storage module. In order to ensure the airtightness and heat exchange efficiency of the phase change heat storage modules, each phase change heat storage module is made of stainless steel by welding, with a heat absorption coating on its outer surface, and phase change materials being filled therein; and the phase change materials are prepared from paraffin wax and expanded graphite through compounding, and a phase change temperature thereof is between 20° C. and 25° C., which is beneficial for maintaining the stability of indoor temperature during the day and the release of heat at night in the passive phase change storage sunlight room, to achieve the purpose of peak load shaving. Firstly, the stainless steel is cut according to required shapes of surfaces of the module. Then, the ventilation duct 12 in the phase change heat storage module 1 and the vent 10 located in the top of the phase change heat storage module are welded. Steel plates with openings in the front side, upper side and lower side of the phase change heat storage module are welded on the ventilation duct 12, and finally steel plates on the rear side and left side of the phase change heat storage module are welded. The molten phase change materials are filled into the module through the opening in the right side of the phase change heat storage module 1. After the phase change heat storage module is filled with the phase change materials completely, a steel plate on the right side of the phase change heat storage module is welded, and therefore the construction of the phase change heat storage module 1 is completed.

Figure 5:
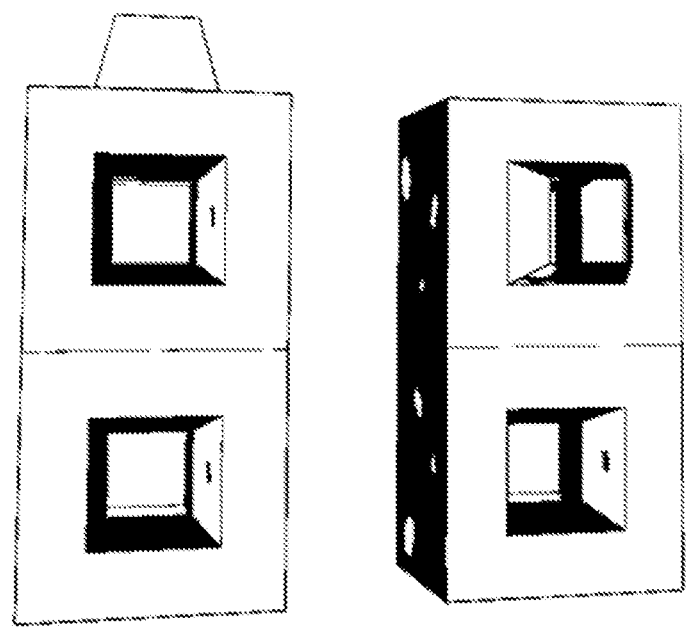
FIG. 5 is a splicing diagram of a phase change heat storage module.

The vents located on the tops of the phase change heat storage modules are spliced with the vents in the front parts and bottoms of other phase change heat storage modules. The vents in the tops of the phase change heat storage modules may be inserted into openings in the front parts or bottoms of other phase change heat storage modules for mortise and tenon joint, to achieve the combination of the plurality of phase change heat storage modules. The form of the spliced phase change heat storage modules is shown in FIG. 5. In practical construction, the phase change heat storage modules should be combined against the internal solid wall of the passive phase change storage sunlight room, and the properly spliced phase change heat storage modules are fixed to the solid wall of the passive phase change storage sunlight room by gluing or buckling. As shown in FIG. 2, it should be ensured that the opening in the front part of each phase change heat storage module faces an interior of the passive phase change energy storage sunlight room to achieve heat exchange with air in the passive phase change energy storage sunlight room through natural convection. The phase change heat storage modules located on the top should be spliced transversely, and the vent in the top of each phase change heat storage module is connected with the ventilation port of the room, which facilitates heat exchange between high-temperature hot air in the passive phase change energy storage sunlight room and air in the room through convection in the daytime.

The working process of the heat supply system coupling the passive phase change energy storage sunlight room and the air source heat pump in the present disclosure is shown as follows.

Energy storage and heating condition of the passive phase change energy storage sunlight room during the daytime: if weather conditions are good during the daytime, the internal air temperature of the passive phase change energy storage sunlight room rises, the phase change heat storage modules store energy by directly absorbing solar radiation and performing heat exchange with the air in the passive phase change energy storage sunlight room; and meanwhile, the ventilation port in the to-be-heated room is opened, and the heat is fed into the to-be-heated room by the air in the passive phase change energy storage sunlight room through the ventilation port for heating the room.

Energy storage and heating condition of the air source heat pump during the daytime: if the weather conditions are normal during the daytime, and the internal air temperature of the passive phase change energy storage sunlight room is higher than outdoor temperature, but the passive phase change energy storage sunlight room cannot provide heating for the room directly, the phase change heat storage modules may store energy by directly absorbing solar radiation. Meanwhile, the temperature of the evaporative side of the air source heat pump may be increased by the internal air temperature of the passive phase change energy storage sunlight room, and the energy consumption of the air source heat pump for heating the room is reduced.

Energy release and heating condition of the passive phase change energy storage sunlight room at night: if the phase change heat storage modules store sufficient heat during the day, the heat is released to the passive phase change energy storage sunlight room to provide heating for the room through the ventilation port at night.

Energy release and heating condition of the air source heat pump at night: if the heat stored by the phase change heat storage modules is not enough for directly heating the air in the passive phase change energy storage sunlight room to provide heating for the room, the room is heated by the air source heat pump. The phase change heat storage modules release the heat to increase the temperature of the evaporative side of the air source heat pump, and therefore the COP of the air source heat pump unit is improved and the power consumption is reduced.

The invention claimed is:

1. A heat supply system coupling a passive phase change energy storage sunlight room and an air source heat pump, comprising a passive phase change energy storage sunlight room (7), phase change heat storage units (11), a to-be-heated room (8), and an air source heat pump air heater arranged between the passive phase change energy storage sunlight room (7) and the to-be-heated room (8), wherein each phase change heat storage unit (11) consists of a plurality of phase change heat storage modules (1);

the air source heat pump air heater further comprises an air source heat pump evaporator (2), an air source heat pump compressor (3), an air source heat pump condenser (4) and an air source heat pump expansion valve (5); wherein:

the phase change heat storage units (11) and the air source heat pump evaporator (2) are arranged in the passive phase change energy storage sunlight room (7), and the air source heat pump evaporator (2) is surrounded by the phase change heat storage modules of the passive phase change energy storage sunlight room (7); a ventilation port (6) and the air source heat pump condenser (4) are arranged in the to-be-heated room (8);

the air source heat pump expansion valve (5) and the air source heat pump compressor (3) are arranged on a circuit consisting of the air source heat pump evaporator (2) and the air source heat pump condenser (4);

prismatic ventilation ducts (9) with a uniform size are arranged at a bottom, a front part and an upper part of each phase change heat storage module (1) respectively, and a vent (10) with the same size as that of the prismatic ventilation ducts (9) is additionally welded on a top of each phase change heat storage module; a ventilation duct (12) is arranged in each phase change heat storage module (1);

the vents of the phase change heat storage modules located on the top are spliced with the vents of other phase change heat storage modules to achieve a combination of the plurality of phase change heat storage modules, and the spliced phase change heat storage modules are fixed to a solid wall of the phase change energy storage sunlight room by gluing or buckling;

an opening in the front part of each phase change heat storage module faces an interior of the passive phase change energy storage sunlight room to achieve heat exchange with air in the passive phase change energy storage sunlight room through natural convection; and the phase change heat storage modules located on the top are spliced transversely, and the vent in the top of each phase change heat storage module is connected with the ventilation port of the room, which facilitates heat exchange between high-temperature hot air in the passive phase change energy storage sunlight room and air in the room through convection during daytime.

2. The heat supply system coupling a passive phase change energy storage sunlight room and an air source heat pump according to claim 1, wherein each phase change heat storage module (1) is made of stainless steel by welding, with a heat absorption coating on its outer surface, and phase change materials being filled therein; and the phase change materials are prepared from paraffin wax and expanded graphite through compounding, and a phase change temperature thereof is between 20° C. and 25° C.

* * * * *